Jan. 26, 1960 R. S. RAE 2,922,287

LIQUID STORAGE TANK

Filed March 22, 1954 9 Sheets-Sheet 1

RANDOLPH SAMUEL RAE,
INVENTOR.

BY R. E. Geauque

ATTORNEY

Jan. 26, 1960 R. S. RAE 2,922,287
LIQUID STORAGE TANK
Filed March 22, 1954 9 Sheets-Sheet 2

RANDOLPH SAMUEL RAE,
INVENTOR.

BY R. E. Geauque
ATTORNEY

RANDOLPH SAMUEL RAE,
INVENTOR.

BY R. E. Geauque
ATTORNEY

Jan. 26, 1960 R. S. RAE 2,922,287

LIQUID STORAGE TANK

Filed March 22, 1954 9 Sheets-Sheet 4

RANDOLPH SAMUEL RAE,
INVENTOR.

BY R. E. Geauque

ATTORNEY

Jan. 26, 1960 R. S. RAE 2,922,287
LIQUID STORAGE TANK
Filed March 22, 1954 9 Sheets-Sheet 5
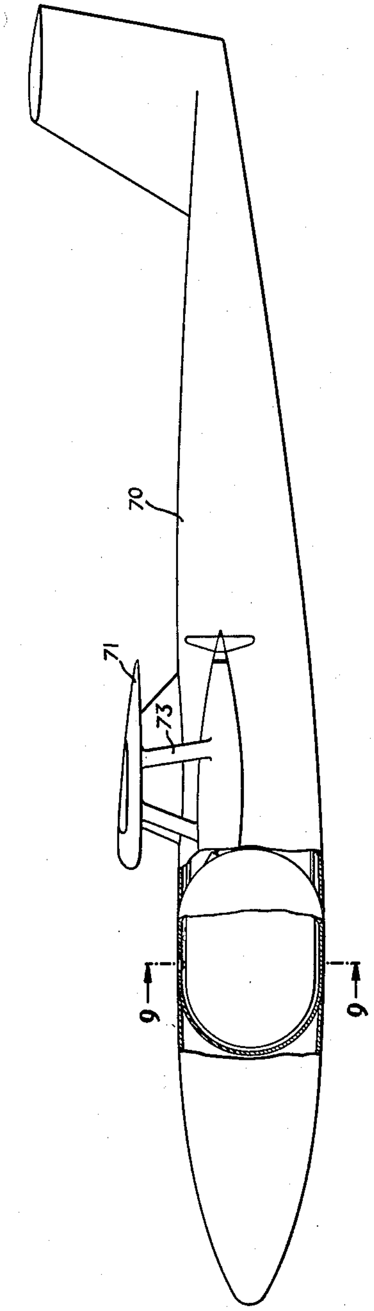
FIG 7
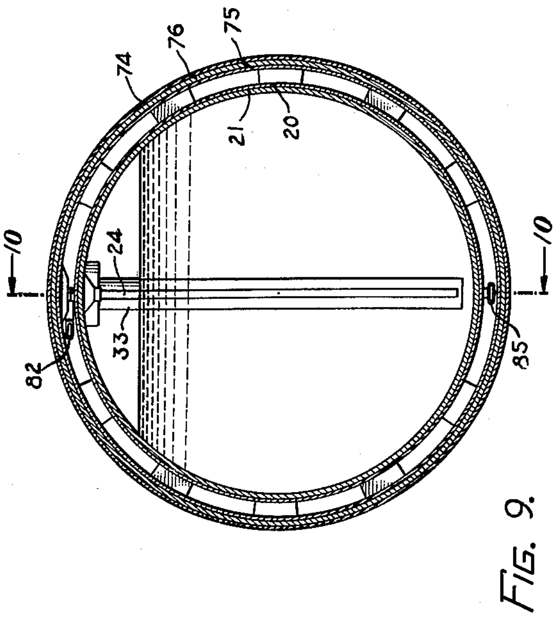
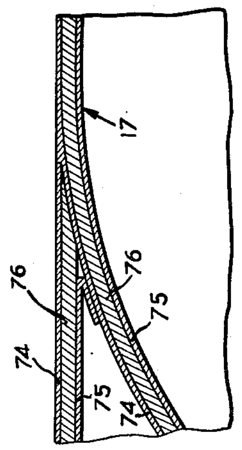
FIG. 8.
RANDOLPH SAMUEL RAE,
INVENTOR.
BY R. E. Geauque
ATTORNEY Jan. 26, 1960 R. S. RAE 2,922,287

LIQUID STORAGE TANK

Filed March 22, 1954 9 Sheets-Sheet 6

RANDOLPH SAMUEL RAE,
INVENTOR.

BY R. E. Geauque

ATTORNEY

Jan. 26, 1960 R. S. RAE 2,922,287

LIQUID STORAGE TANK

Filed March 22, 1954 9 Sheets-Sheet 7

RANDOLPH SAMUEL RAE,
INVENTOR.

BY R. E. Geauque

ATTORNEY

Jan. 26, 1960 R. S. RAE 2,922,287

LIQUID STORAGE TANK

Filed March 22, 1954 9 Sheets-Sheet 8

RANDOLPH SAMUEL RAE,
INVENTOR.

BY R. E. Geauque

ATTORNEY

RANDOLPH SAMUEL RAE,
INVENTOR.

BY R. E. Grangue
ATTORNEY

United States Patent Office 2,922,287 Patented Jan. 26, 1960

2,922,287

LIQUID STORAGE TANK

Randolph Samuel Rae, Santa Monica, Calif., assignor to The Garrett Corporation, Los Angeles, Calif., a corporation of California Application March 22, 1954, Serial No. 417,658

2 Claims. (Cl. 62—52)

This invention relates to a liquid storage tank and more particularly to a tank for storing liquified gases at low temperatures. For instance, the tank is applicable to the storage of liquid helium, oxygen, hydrogen and the like, which must be maintained at very low temperatures to prevent excessive evaporation.

At present, such liquids are usually stored in steel tanks having evacuated spaces for insulation purposes. However, if any quantity of such a liquid is to be transported, such types of tanks become too large and heavy because of the metal construction and the type of insulation utilized. By the present invention, a storage tank is provided in which the cold gases evaporating from the liquid, serve to prevent the transfer of heat to the liquid from the surroundings and it is unnecessary to have vacuum insulation. The tank construction disclosed in the present invention is therefore applicable to installations where weight is important, such as to installations which are for transportation purposes or for purposes of carrying the propelling medium for a vehicle or craft. For instance, in copending U.S. application, Serial No. 417,867, filed March 22, 1954, by Randolph S. Rae, a non-air breathing engine is disclosed for use in propelling vehicles, such as aircraft and submarines, and this engine is constructed to utilize low temperature liquids, such as liquid hydrogen. In such case, it is necessary that the tank be of minimum weight and still prevent excessive evaporation of the low temperature liquid stored therein. Since it is contemplated that a liquid, such as liquid hydrogen, will be carried in the tank at atmospheric pressure, it is apparent that the liquid will begin to evaporate at a temperature of 20° K. or minus 423° Fahrenheit. By utilizing the evaporated gases to carry away most of the heat from the liquid, it is possible to provide a tank which is well insulated from its surroundings and has minimum weight.

In one form of the invention, the gases resulting from evaporation of the liquid are passed to a heat exchanger where they are cooled by the gases pumped from the tank and the cooled gases then pass around the liquid storage tank in order to carry the heat away from the tank itself. When the volume of cooling gases becomes too great, it is possible to exhaust a portion of the gases to atmosphere. In a second form of the invention, the gases that evaporate from the liquid are passed completely around the liquid tank and then allowed to exhaust to atmosphere. In this second modification of the invention, the evaporation rate of the liquid will reach a value which will just compensate for the heat attempting to pass to the liquid from the surroundings. The tank of either modification can be constructed as a part of the craft in which it is mounted in order to utilize the tank structure as part of the structure of the craft.

It is therefore an object of the present invention to provide a tank for storing liquids at low temperatures, which tank is of minimum weight for transportation purposes.

Another object of the invention is to provide a liquid storage tank for low temperature liquids in which the cold gases evaporating from the liquid are passed around the liquid tank in order to prevent heat transfer to the liquid.

A still further object of the invention is to provide a storage tank for low temperature liquids which has an inner insulated container for storing the liquid and an outer insulated container forming a passageway between said two containers in order to pass the cooling gases around the inner container and prevent heat transfer to the liquid.

Another object of the invention is to provide a storage tank for low temperature liquids in which the liquid is continually cooled by gases which evaporate from the liquid and which are cooled by passage through a heat exchanger connected with the outlet of the tank.

A further object of the invention is to provide a storage tank for low temperature liquids in which the liquid is continually cooled by exhausting the gases evaporating from the liquid around the liquid container.

Another object of the invention is to provide a storage tank for low temperature liquids which is so constructed that it can become a structural part of its mounting craft and thereby reduce the weight added to the craft by reason of the tank.

These and other objects of the invention not specifically set forth above will become readily apparent from the following specification and drawings in which:

Figure 7 is an elevational view partly in section of an aircraft and illustrating the manner in which the tank can be mounted in the aircraft as part of the aircraft structure.

Figure 8 is an enlarged sectional view similar to Figure 7 illustrating the particular construction details whereby the outer shell is formed as part of the skin or surface of the aircraft.

Figure 9 is a transverse vertical view along line 9—9 of Figure 7 and illustrating the shape of the tank which forms a part of the surface of the aircraft.

Figures 1, 2:
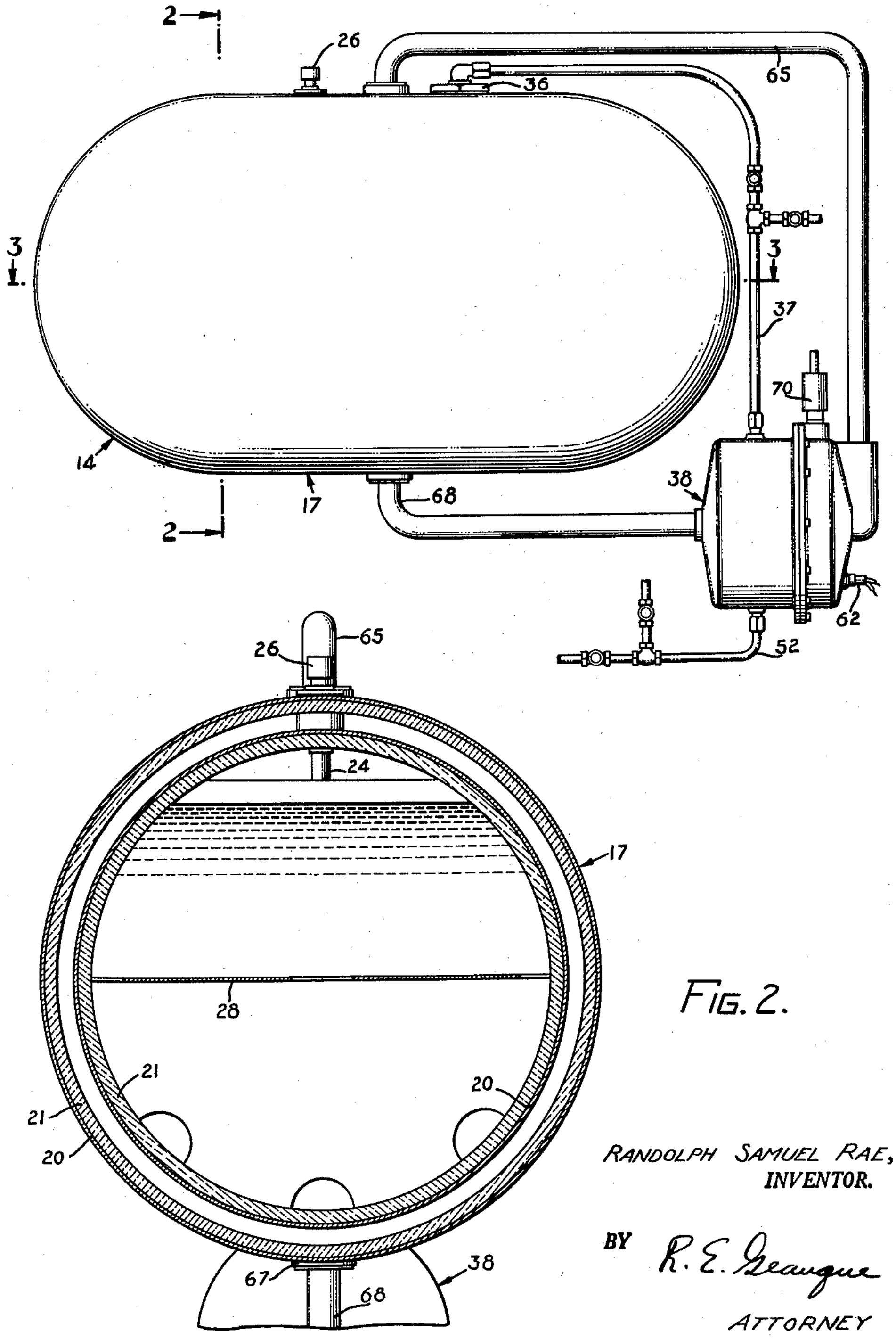
Figure 1 is a side elevational view of the tank comprising the first embodiment of the invention.
Figure 2 is a transverse vertical section along line 2—2 of Figure 1 showing the liquid inlet to the tank.
Figure 3:
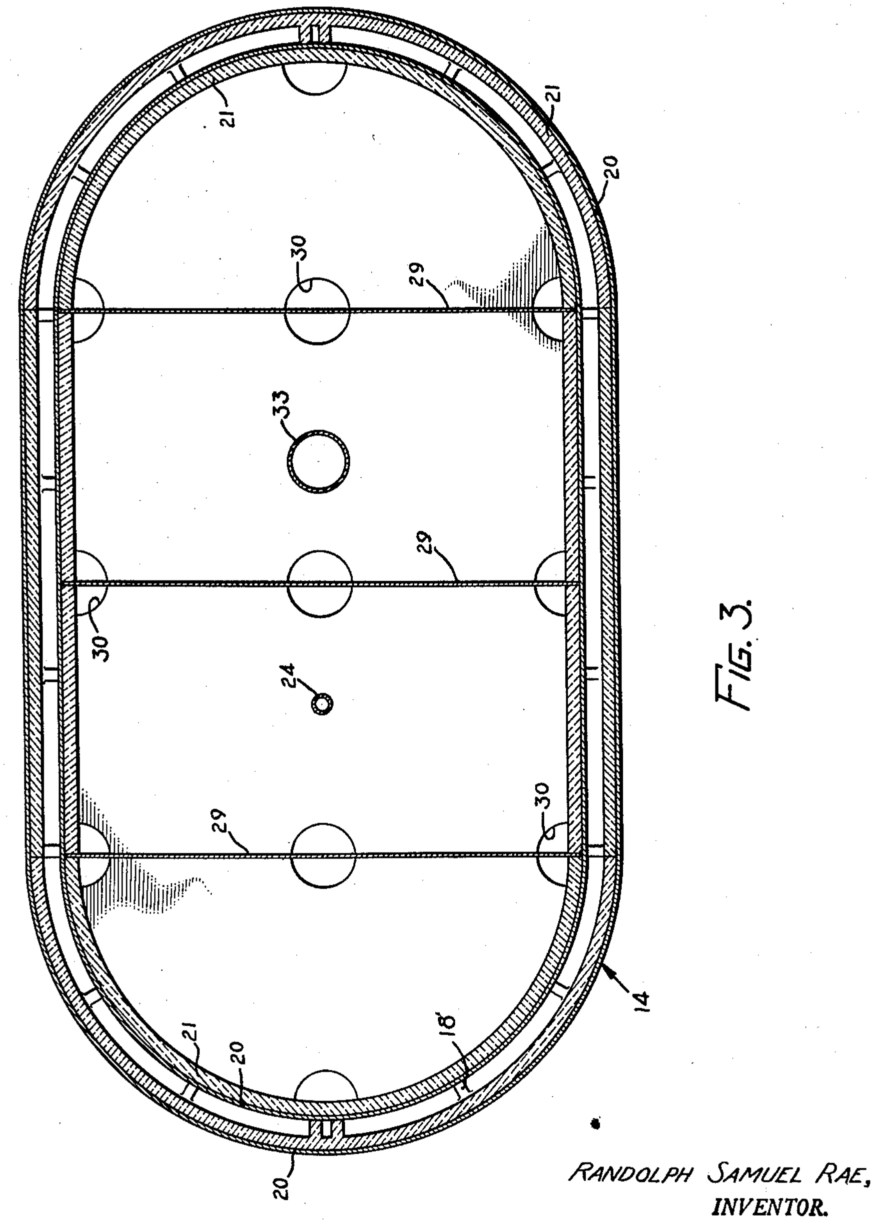
Figure 3 is a horizontal section view along line 3—3 of Figure 1 illustrating the manner in which baffles are installed in the inner shell to prevent sloshing of the liquid.
Figure 4:
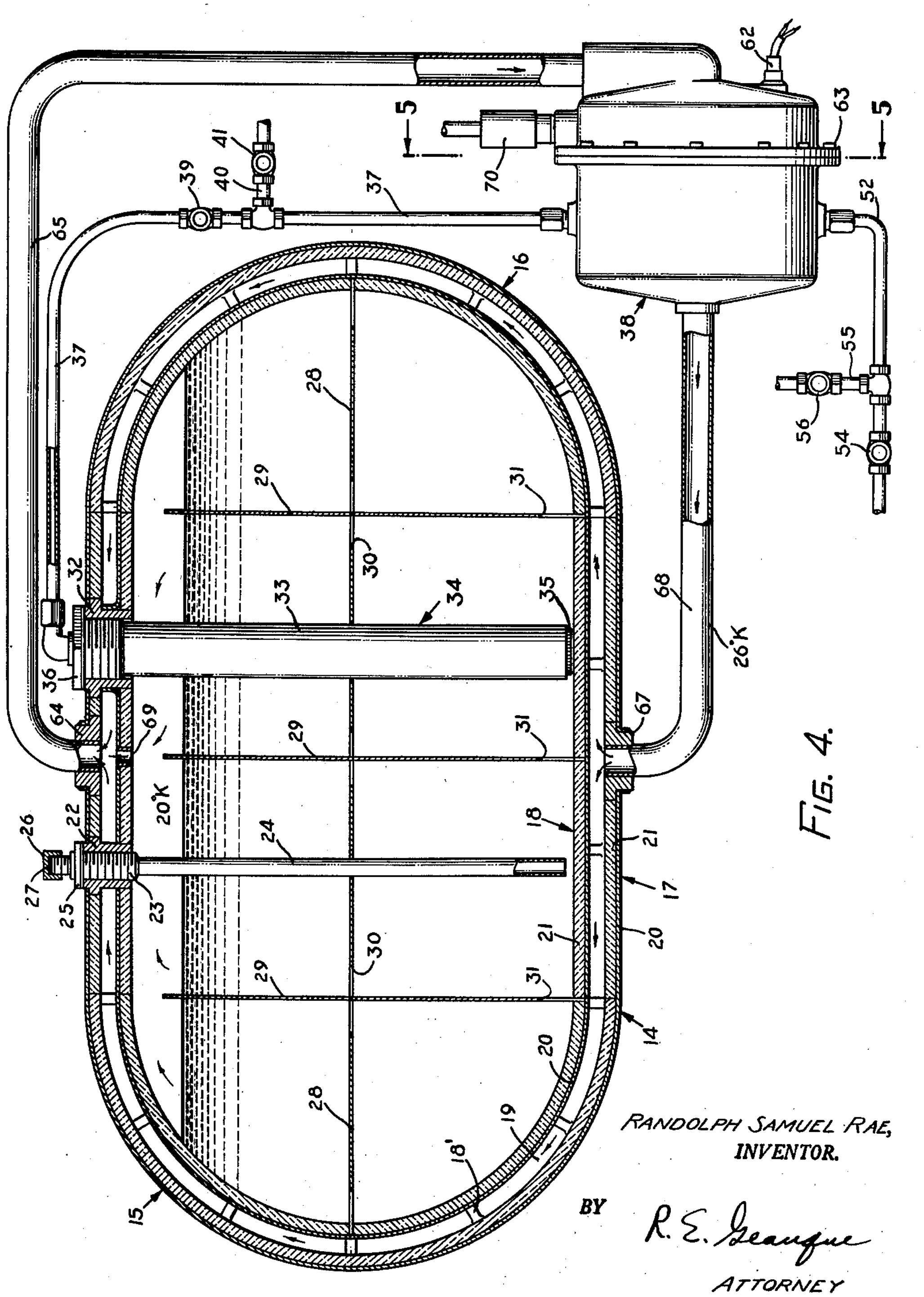
Figure 4 is a vertical sectional view of the tank showing the manner in which the cooling gases are passed through a heat exchanger and then around the inner shell of the tank.
Figures 5, 6:
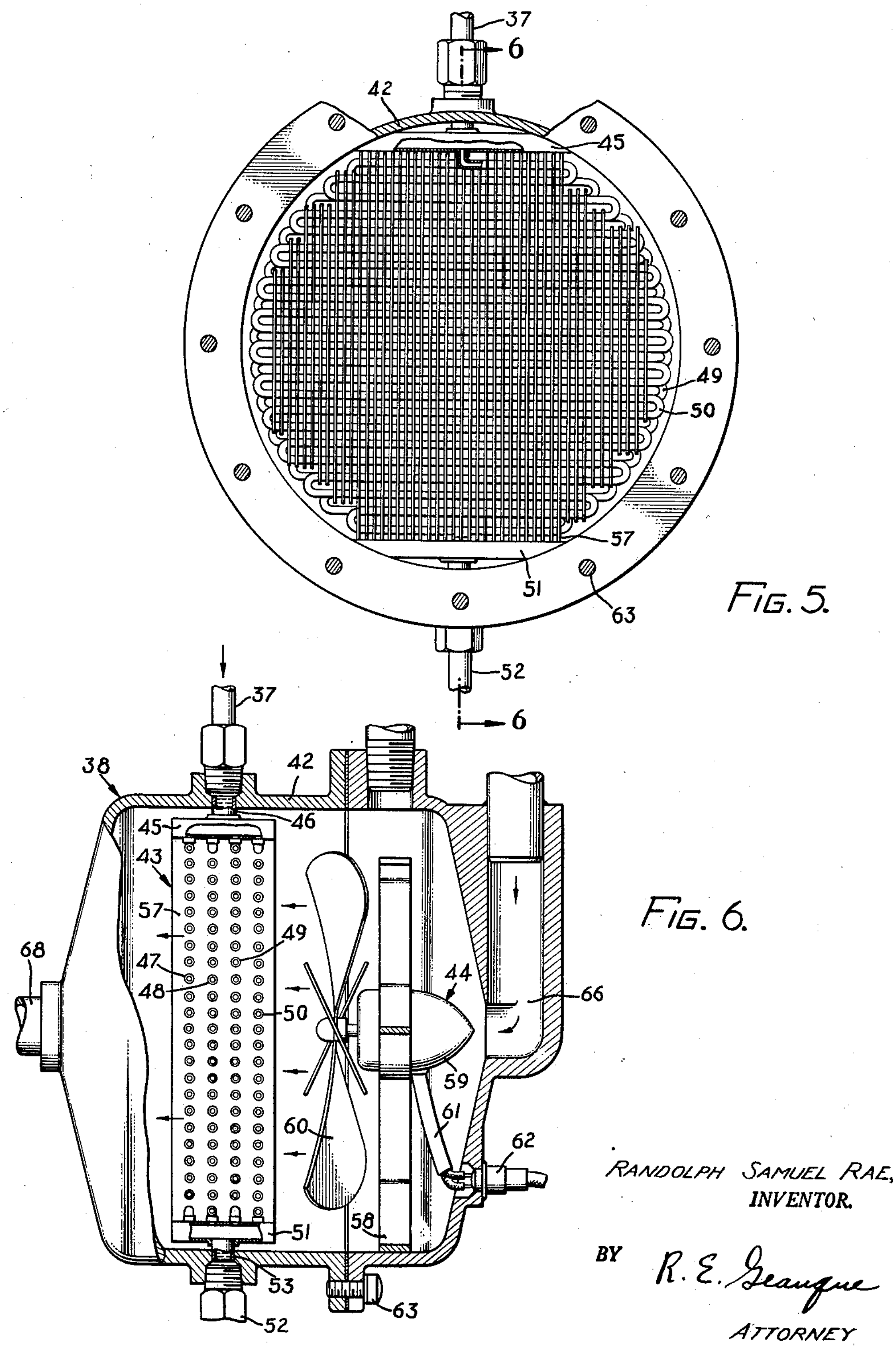
Figure 5 is a transverse vertical section along line 5—5 of Figure 4 illustrating the cooling coils which cool the gases evaporating from the tank.
Figure 6 is a vertical sectional view along line 6—6 of Figure 5 showing the fan for moving the evaporated gases from the tank through the heat exchanger.

Referring to the form of the invention shown in Figure 1, the tank 14 is cylindrical in shape and has dome shaped end sections 15 and 16. The tank is comprised of an outer shell 17 and an inner shell 18 which are secured together and held in spaced relationship by means of a number of struts 18' in order to form a passage 19 between the shells. Both the inner and outer shells have a rigid surface 20 to which is secured, by cementing or otherwise, a layer of insulating material 21. The rigid surface 20 can be formed of any suitable material, such as sheet metal, plywood or synthetic fiberglass, while the insulation 21 can be any type of well-known insulation material, such as expanded fiberglass or plastic, which will not be affected by the substance carried in the tank. A cylindrical member 22 passes through and is secured to both shells 17 and 18 of the tank in order to provide an inlet passage for the tank. The interior of member 22 is threaded to receive the threaded portion 23 of inlet tube 24 which projects approximately to the bottom of the tank. Tube 24 has a collar 25 which engages the surface of the member 22 and also has a cap 26 containing a flexible material 27 for covering the opening in the end of tube 24. When cap 26 is removed, the tank 14 can be connected to the source of low temperature liquid which can be pumped into the tank. The inner shell 18 supports a horizontal baffle 28 extending completely around the tank and a number of vertical baffles 29 which extend almost to the top of the shell. It is apparent that the purpose of the baffles 28 and 29 is to prevent sloshing of the liquid within the tank but some movement of the liquid is allowed by the openings 30 in baffle 28 and by openings 31 in baffle 29. A cylindrical member 32 passes through both the shells and is threaded to receive the housing 33 of a standard type pump 34 which has a screened inlet 35. The housing has a projection 36 which engages member 32 when the pump is installed in the tank. The pump can be electrically operated in the usual manner by a motor installed within the casing 33 and the outlet of the pump is connected by passage 37 to heat exchange unit 38. Passage 37 contains a valve 39 and connects with a branch pipe 40 containing the valve 41.

The heat exchanger 38 is comprised of a casing 42 which houses a tube bank 43 and a fan 44, and the passage 37 connects through passage 46 with the inlet header 45 of the tube bank. The tube bank is composed of four rows of coils 47, 48, 49 and 50, all of which connects with the outlet header 51. An outlet passage 52 is connected to outlet header 51 by passage 53 and contains a valve 54. A branch passage 55, containing a valve 56, connects to passage 52 at a point between valve 54 and passage 53. The coils of the heat exchanger pass through a series of cooling fins 57 which aid in the transfer of heat from the cooling coils to the gases in passage 37. A bracket 58 is supported by the interior of casing 42 and serves to support motor 59 which drives the fan blades 60. The electrical energy for the motor is led through the casing to the motor through cable 61 which connects with an exterior plug 62. The casing 42 is constructed of two sections, each of which has a flange so that the casing sections can be held together by screws 63.

When the pump 34 is in operation, the low temperature liquid in inner shell 18 will enter the pump and because of the work done on the liquid by the pump, the passage 37 will receive high pressure gases at a temperature substantially the same as the temperature of the liquid. For instance, if the liquid is hydrogen at a temperature of 20° K., the passage 37 will contain high pressure hydrogen gas at approximately the temperature of 23° K. In normal operation, the valves 39 and 54 will be open while valves 41 and 56 will be closed, so that the gases in passage 37 will pass through the tube bank 43 of heat exchanger to the passage 52 which leads to the point of use of the high pressure gases. The passage 52 can connect with a non-air breathing engine which utilizes the gases to propel the craft or vehicle carrying the tank.

A member 64 is supported by the outer shell 17 and receives one end of a passage 65, while the other end of the passage 65 connects with passage 66 leading to the interior of the casing 42. The outer shell 17, likewise contains a member 67 which receives one end of a passage 68, which is connected at its other end to the casing 42 at a position opposite from passage 66. The inner shell 18 has a single opening 69 which allows the gases resulting from evaporation of the liquid to pass through the inner shell and then to the passage 65.

When the fan 44 is in operation, the gases within the space 19 between the two shells and the gases evaporating from the liquid surface will be forced by fan 44 past the tube bank 43 so that the temperature of these gases will be lowered by the cooler gases entering the tube bank from passage 37. Upon leaving the heat exchanger, the gases will pass through passage 68 into the space 19 and will move around the inner shell 18 in order to remove most of the heat which would otherwise be transferred to the liquid contained in the inner shell 18. When liquid hydrogen is stored in the tank, the gases passing through the opening 69 will be at approximately the same temperature as the liquid hydrogen, namely 20° K. and the gases leaving space 19 will have a substantially higher temperature because of the heat absorbed by the gases. Thus, the temperature of the mixture of gases in passage 65 will be determined by the quantity of gases from these two sources and will be in the neighborhood of 36° K.

Thus, the passage 65, heat exchanger 38, passage 68 and space 19 form a closed path for the circulation of gases in order to cool the liquid within the inner shell. Since the temperature of the gases in passage 37 is only slightly higher than the liquid temperature, the circulating gases will be cooled to a temperature in the neighborhood of 26° K. which is only slightly higher than the temperature of the liquid. Since gases are continually being added to the cooling cycle through passage 69 by evaporation of the liquid, the casing 42 contains a relief valve 70 so that when the pressure of the gases in the cooling cycle exceeds a certain value, the gases can pass off to atmosphere. Because of the heat taken up by the gas in passing through the coil bank 43, the gases entering passage 52 will, of course, be at a higher temperature than the gases in passage 37. In the case of hydrogen, where it is finally to be ignited for propulsion purposes, this increase in the temperature of the gases adds to the efficiency of the heating cycle.

In the event that it is not desired to withdraw the stored substance from the tank, means are provided to continually cool the liquid to prevent excessive evaporation. In such a case, the valves 39 and 54 will be closed and the valves 41 and 56 will be open in order to connect some exterior cooling means with the tube bank 43. For instance, a supply of liquid hydrogen can be connected between passage 40 and passage 55 so that the cooling medium can be passed through the coil bank 43. Such a cooling medium would have a temperature ranging between 20° K. and 23° K. and, of course, if liquid helium were used, temperatures as low as 3° K. could be used for cooling purposes. Thus, by connecting an external cooling supply to the passages 40 and 55, the gases circulated by fan 44 could be continually cooled to prevent excessive evaporation from the liquid tank while the pump 34 is inoperative. The differential in temperature between the gases in passage 68 and in passage 65 represents the amount of heat absorbed by the gases in passing around the inner shell and a sufficient quantity of gases will be passed through the cooling cycle in order to absorb most of the heat passing through the outer shell to the inner shell. Thus, with the inner and outer shells insulated and spaced apart to form passage 19 for the cooling gases, it is possible to transport low temperature liquids without excessive evaporation taking place. The storage tank just described is especially useful to storing low temperature liquids which must be transported with a minimum of weight added for storage purposes, and the tank is very suitable for use in storing low temperature liquids which are utilized to propel the transporting craft.

An aircraft installation of the tank just described is illustrated in Figures 7 through 10 and the tank can be utilized to store low temperature liquid used in propelling the aircraft, or could equally well be used for transporting low temperature liquids by air where the weight of the storage tank is of prime importance. In the description of this aircraft installation, like numerals designate like parts as in the previous description. The tank is installed in the section of the fuselage forward of wing 71 and the engines for the aircraft are supported from the wing by struts 73. The skin of the aircraft fuselage can be constructed of a rigid outer and inner layer 74 and 75, respectively, with a lightweight material 76 spaced therebetween in order to give increased strength to the skin. The inner and outer surfaces 74 and 75 can be fabricated of suitable lightweight material, such as plywood or synthetic fiberglass, whereas the spacing material 76 can be some suitable type of light, bulky material, such as balsawood or expanded fiberglass. In the present installation, the cylindrical section of the tank between the dome end sections can be substituted for the skin of the aircraft by forming the outer shell of the same construction materials as the skin of the aircraft. Therefore, the outer shell of the tank will comprise layers 74 and 75 spaced apart by an inner layer 76 and these layers will be of the same materials as form the respective layers of the skin of the aircraft. Figure 8 illustrates the manner in which the surface of the tank is joined to the surface of the fuselage and such a juncture is formed by cementing or otherwise securing the layers 74, 75 and 76 of the fuselage to the outer layer 74 of the tank. Since the inner layer 76 of the outer shell 17 is constructed of lightweight, bulky material, the layer 76 makes an excellent insulator for the tank. Since the surface of the outer shell can be used for the surface of the aircraft over a portion of the fuselage, a substantial saving in weight can be realized over a separate tank installation.

Figure 10:
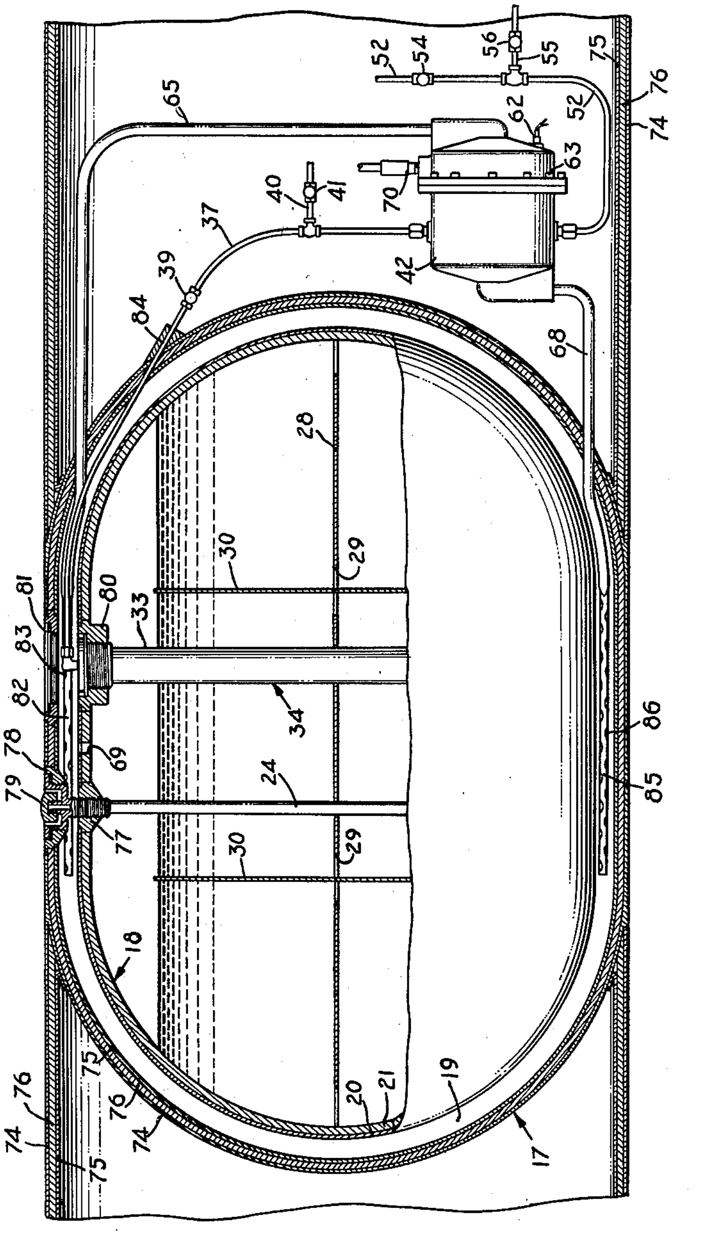
Figure 10 is a vertical sectional view along line 10—10 of Figure 9 illustrating the manner in which the heat exchanger and other components of the tank are installed within the aircraft.
Figure 11:
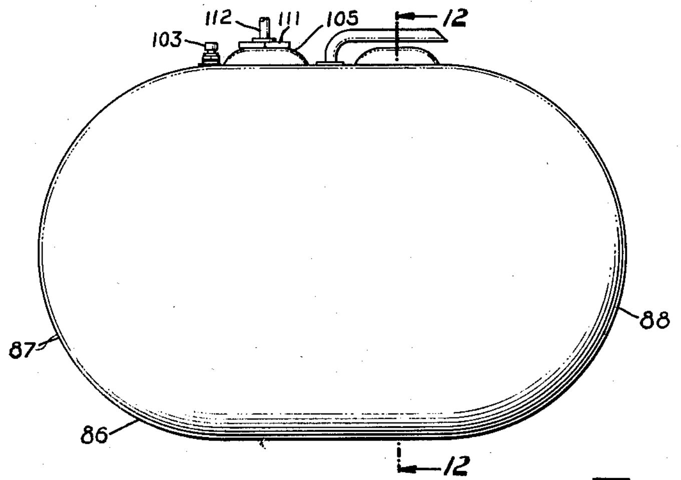
Figure 11 is a side elevational view of a second form of the invention illustrating the overall shape of the tank.
Figure 12:
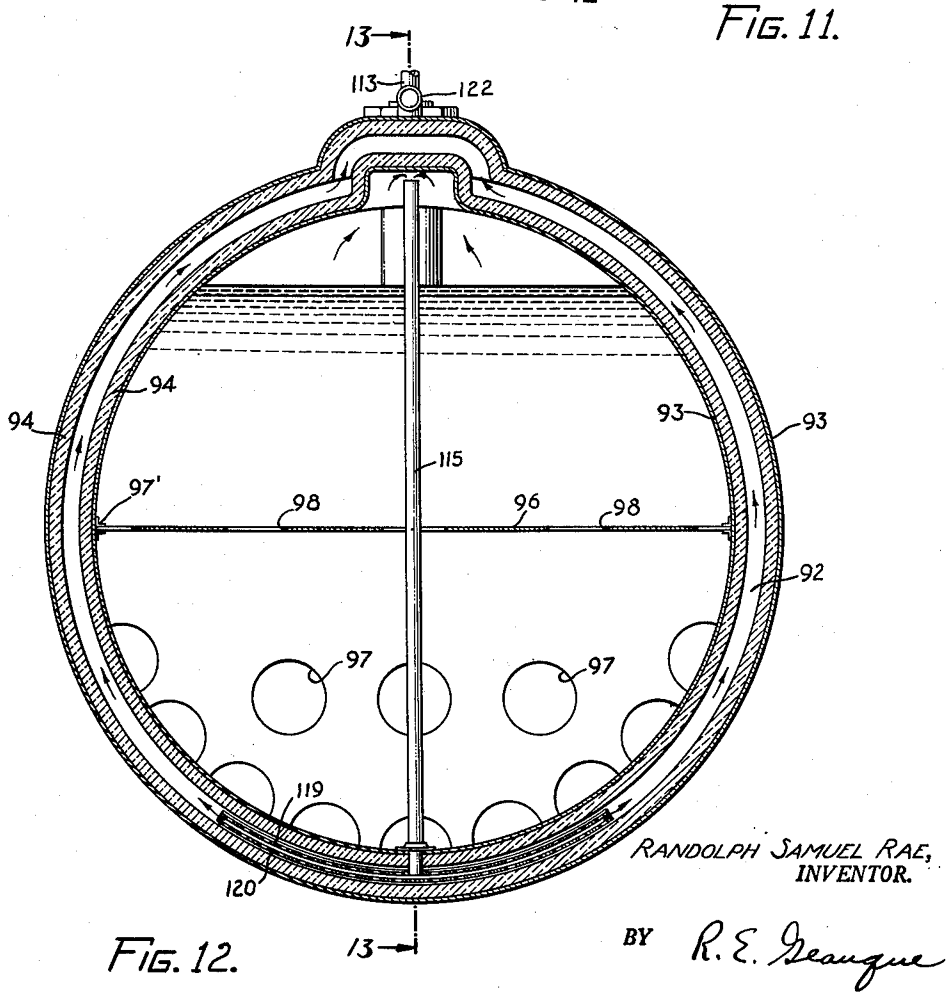
Figure 12 is a transverse vertical section along line 12—12 of Figure 11 illustrating the two shells of the tank and the manner in which the gases pass between the shells.
Figure 13:
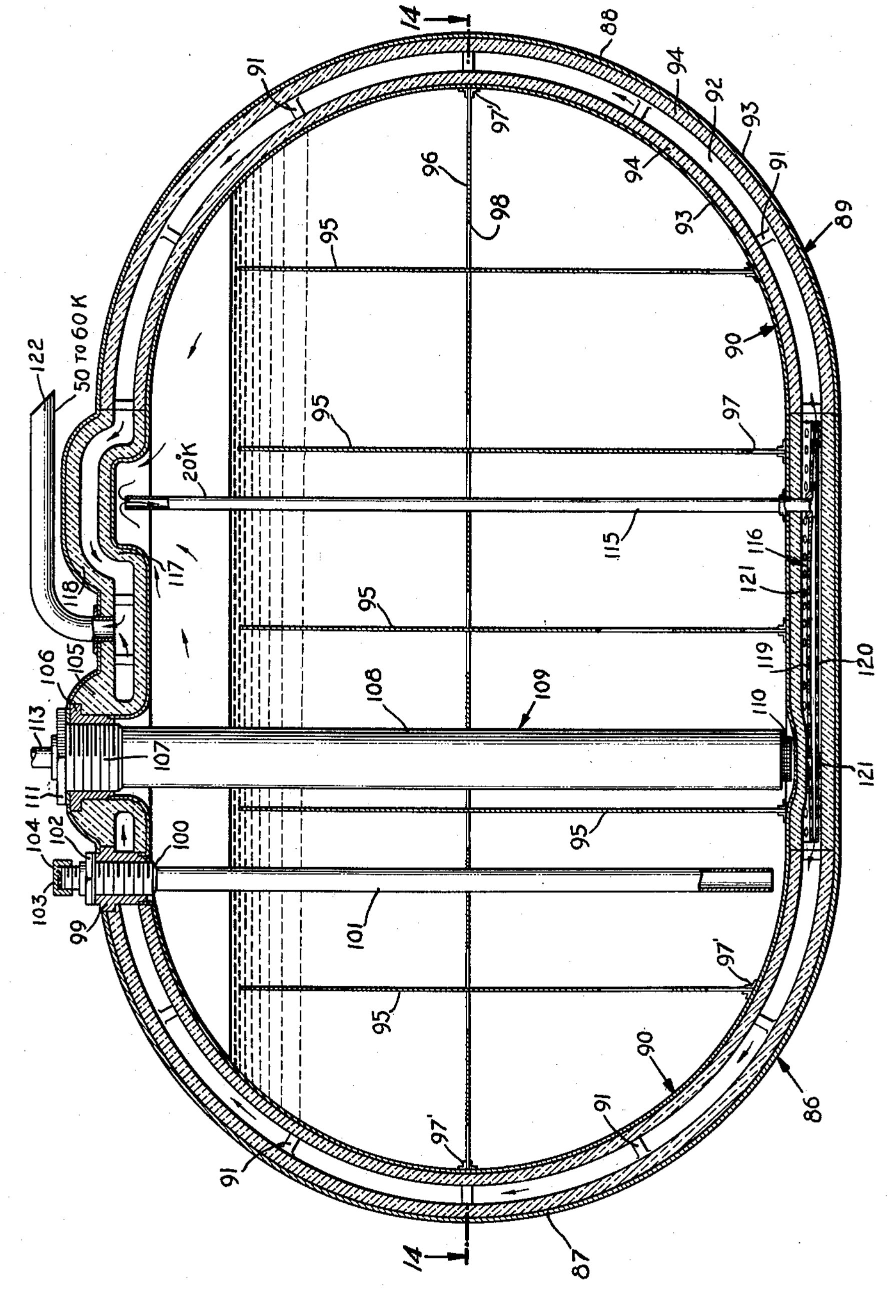
Figure 13 is a vertical sectional view along line 13—13 of Figure 12 showing the pump installed within the tank.
Figure 14:
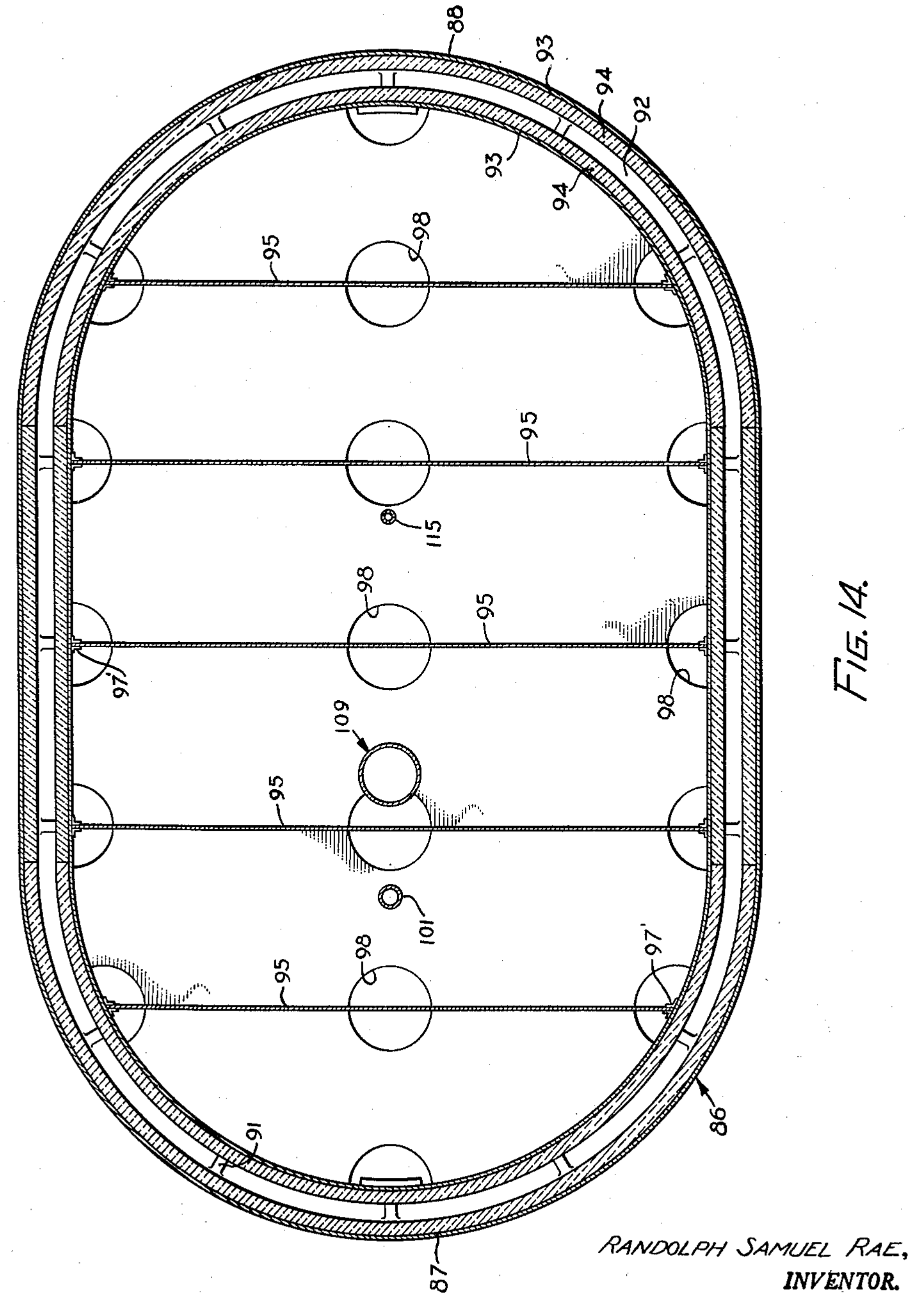
Figure 14 is a transverse horizontal section along line 14—14 of Figure 13 illustrating the baffling in the tank.

With the tank so installed in the aircraft, it is necessary to modify the tank previously described in the manner illustrated in Figure 10. The inner shell 18 of the tank is formed of an outer layer 20 and insulating layer 21 in the same manner as previously described and the inner shell has baffles 28 and 29 for the purpose of preventing any substantial movement of the liquid. In order to keep the surface of the aircraft smooth, it is necessary to place the inlet and outlet passages to the tank flush with the surface of the tank. Therefore, the inlet passage 24 is threaded into a support member 77 retained in the inner shell and into a support member 78 retained in the outer shell. Support member 78 has a depression for receiving the cap 79 for the inlet passage. The casing 33 of pump 34 is also threaded into member 80 supported by the inner shell and the outer shell contains a plug 81 which can be removed in order to install the pump. Because of the fact that there can be no piping external of the fuselage skin, it is also necessary to have a pickup tube 82 on the end of passage 65 so that the gases passing up around the inner shell can be collected through a number of holes 83 located at the center portion of the tank. The passage 65 can then pass through the side of the outer shell rather than connect to the top of the outer shell. Also, it is necessary to have passage 37 from the pump pass through the outer shell at support member 84 so that this passage will not be exterior of the aircraft. The passage 68 also enters the side of the outer shell and connects with a tube 85, having a number of openings 86 for dispersing the cooling gas over the bottom surface of the tank for even distribution through the space 19. It is understood that the casing 42 contains the tube bank 43 and the fan 44 in the same manner as previously described, and that the pickup tube 82 collects the gases from the space 19 and from opening 69. The gases passing through opening 69 to tube 82 have a temperature about the same as the liquid whereas the gases entering tube 82 from passage 19 have a higher temperature so that the gases in passage 65 are at some temperature between these two temperatures. As previously stated, when liquid hydrogen is being carried, the gases passing through passage 69 have a temperature of about 20° K. whereas the gases in passage 65 have a temperature of about 36° K. The gases entering the coil bank 43 from passage 37 have a temperature of about 23° K. and the gases leaving the heat exchanger in passage 68 have a temperature of about 26° K. Thus, the gases evaporated from the liquid are used to continually carry away the heat which passes through the outer shell and prevents most of this heat from entering the liquid through the inner shell. This aircraft installation is also equipped with passages 55 and 40 which serve to supply an independent cooling medium to the heat exchanger when the pump 34 is not in operation and valves 39 and 54 are closed. The outlet passage 52 can supply the propelling medium for the aircraft engines in the event that the substance carried by the tank is for that purpose. It is understood that the tank can be equally well carried by other vehicles than aircraft with the same saving in weight.

A second form of the invention is illustrated in Figures 11 through 14 wherein a tank 86 is shown generally cylindrical in cross section and has dome shaped end sections 87 and 88. The tank is composed of an outer shell 89 and an inner shell 90 which are secured together and held in spaced relationship by means of a number of struts 91 in order to form a passage 92 between the shells. Both the inner and outer shells have a rigid surface 93 to which is secured, by cementing or otherwise, a layer of insulating material 94. The surface 93 and layer 94 can be constructed of the same materials as surface 20 and layer 21, respectively, of the tank first described, and both layers 94 are positioned to border the passage 92 between the two shells.

The inner shell 90 contains a number of vertical baffles 95 and a horizontal baffle 96, all of which baffles are supported by brackets 97' carried by surface 93 of the inner shell. Baffles 95 and baffle 96 contain openings 97 and 98, respectively, to permit some movement of the low temperature liquid within the tank. A circular member 99 passes through and is secured to both shells of the tank and receives the threaded section 100 of the inlet tube 101, which extends almost to the bottom of the inner shell 90. The tube has a collar 102 which engages member 99 and a cap 103, having flexible layer 104, serves to close the end of the tube. When cap 103 is removed, low temperature liquid can be passed into the tank for storage purposes.

The shells 89 and 90 join together to form an enlarged portion 105 which contains a circular member 106 for receiving the threaded portion 107 of casing 108 for pump 109. The casing 108 has a screened inlet 110 and a flange 111 which bears against surface 93 of the outer shell. The pump has an outlet passage 113 which leads to the point of use of the stored liquid. A tube 115 is vertically supported within the inner shell 90 and passes through the lower portion of the shell in order to connect with disbursing plate 116, contained in passage 92 between the shells. The inlet end of tube 115 is positioned within a bulge 117 in the upper portion of the inner shell so as to be continually positioned above the surface of the liquid in the tank and the outer shell has a bulge 118 in order not to interrupt the passage. The plate 116 is comprised of spaced apart surfaces 119 and 120, each of which has a plurality of openings 121, and the tube 115 discharges the gases evaporated from the surface of the liquid into the space between the surfaces 119 and 120. These gases pass to the open ends between the surfaces and also through openings 121 in order to disburse the gases evenly along the lower portions of passage 92. The gases then pass upwardly between the two shells in order to carry away most of the heat which would otherwise be transferred to the stored liquid. A passage 122 connects to space 92 and serves to exhaust the cooling gases to atmosphere after passing around the inner shell.

Thus, the cooling gases flowing through passage 92 and the insulated shells cooperate to prevent heat from being transferred to the stored liquid and makes it possible to transport low temperature liquids without excessive evaporation taking place. In the event liquid hydrogen is stored in the tank, the temperature of the exhaust gases leaving passage 122 could be in the vicinity of 50–60° K. while the gases entering the passage 92 from tube 115 will be at a temperature of about 20° K. It is apparent that the liquid in the tank will automatically reach an evaporation rate at which the evaporated gases will permit just enough heat to be transferred to the liquid to maintain the evaporation rate.

By the present invention, a light weight liquid storage tank is provided in which the tank shells are insulated and in which the shells form a passage for cooling gas evaporating from the stored liquid. It is understood that the construction of the shells can incorporate various combinations of insulating materials and that the tanks illustrated herein can be varied in size and shape. The references made to temperatures encountered when liquid hydrogen is stored in the tank are approximate and for purposes of illustration only, and these temperatures will vary widely with the type of stored liquid. Various other modifications of the invention are contemplated by those skilled in the art without departing from the spirit and scope of the invention as hereinafter defined by the appended claims.

What is claimed is:

1. A storage tank for a substance which is liquid at low temperature comprising inner and outer shells spaced apart to form a cooling passage therebetween, a liquid inlet for introducing the low temperature liquid substance into said inner shell, a delivery passage leading from said inner shell to a point of use of said substance, said delivery passage including one confined path of a heat exchanger through which path the substance flows, a gas circulating passage leading from one portion of said cooling passage back to another portion thereof, said gas circulating passage including a second closed path of said heat exchanger, a gas pump in said gas circulating passage causing flow of gas therethrough, a gas outlet passage from said inner shell to said cooling passage for passage of gas evaporating from liquid within said inner shell into said cooling passage to mix with gas already in said cooling passage, and a pressure relief valve in said gas circulating passage, whereby the mixture of gas in said cooling passage passes through said gas circulating passage in heat exchange relationship with the substance passing through said delivery passage.

2. A storage tank as recited in claim 1 wherein said gas circulating passage terminates in a pickup tube at one end and a dispersing tube at the other end, said tubes having a plurality of openings along their length, said pickup tube extending within said cooling passage to collect gas from an area of said cooling passage adjacent said one portion of said cooling passage, and said dispersing tube extending within said cooling passage to distribute gas over an area of said cooling passage adjacent said other portion of said cooling passage.

References Cited in the file of this patent

UNITED STATES PATENTS

| | | |
|---|---|---|
| 646,459 | Place | Apr. 3, 1900 |
| 662,217 | Brady | Nov. 20, 1900 |
| 1,835,699 | Edmonds | Dec. 8, 1931 |
| 1,976,688 | Dana et al. | Oct. 9, 1934 |
| 2,059,942 | Gibson | Nov. 3, 1936 |
| 2,148,109 | Dana et al. | Feb. 21, 1939 |
| 2,586,893 | Westling | Feb. 26, 1952 |
| 2,663,626 | Spangler | Dec. 22, 1953 |
| 2,682,154 | Wilkinson | June 29, 1954 |
| 2,707,377 | Morrison | May 3, 1955 |